United States Patent [19]
Halila et al.

[11] 3,825,364
[45] July 23, 1974

[54] POROUS ABRADABLE TURBINE SHROUD

[75] Inventors: Ely E. Halila; Albert P. Sterman, both of Cincinnati, Ohio

[73] Assignee: General Electric Company, Cincinnati, Ohio

[22] Filed: June 9, 1972

[21] Appl. No.: 261,375

[52] U.S. Cl.................. 415/116, 415/174, 415/178, 277/53, 277/230
[51] Int. Cl............................ F01d 5/08, F01d 5/20
[58] Field of Search ........... 415/117, 116, 115, 174, 415/178; 277/230, 227, 53, 96

[56] References Cited
UNITED STATES PATENTS

| | | | |
|---|---|---|---|
| 2,843,341 | 7/1958 | Dannenberg et al. | 415/116 |
| 2,970,807 | 2/1961 | Endres | 416/231 |
| 3,042,365 | 7/1962 | Curtis et al. | 415/174 |
| 3,053,694 | 9/1962 | Daunt et al. | 415/174 |
| 3,365,172 | 1/1968 | McDonough et al. | 415/174 |
| 3,402,914 | 9/1968 | Kumpelal | 416/97 |
| 3,411,794 | 11/1968 | Allen | 277/53 |
| 3,519,282 | 7/1970 | Davis | 277/230 |
| 3,529,905 | 9/1970 | Meginnis | 415/176 |
| 3,583,824 | 6/1971 | Smuland | 415/117 |
| 3,603,599 | 9/1971 | Laird | 415/174 |
| 3,728,039 | 4/1973 | Plemmons | 415/174 |

*Primary Examiner*—Henry F. Raduazo
*Attorney, Agent, or Firm*—James M. Kipling; Derek P. Lawrence

[57] ABSTRACT

A turbine blade tip-sealing shroud between a rotating bladed turbine and the surrounding casing of a turbojet engine is formed of substantially cylindrical inner and outer layers of porous sintered metal or similar material. The porosity of the radially inner layer is greater than the porosity of the outer layer and is adapted to withstand frictional rubbing contact with the turbine. The outer layer of the shroud is impinged by cooling air for transpiration cooling of the shroud, the amount of cooling air passed therethrough being metered by the porosity of the outer layer. The relative porosities of the two layers enable the shroud to meter the flow of cooling air to maintain this flow in spite of abrasion of the inner layer and the constriction of the pores thereof by the rotating bladed turbine.

3 Claims, 4 Drawing Figures

PATENTED JUL 23 1974　　3,825,364

POROUS ABRADABLE TURBINE SHROUD

BACKGROUND OF THE INVENTION

The present invention relates to shroud members for use in turbomachinery and, more particularly, to shroud members adapted to withstand elevated operating temperatures and abrasion induced by mating rotating elements.

In turbomachinery, a flow of pressurized working fluid is directed onto a plurality of blades mounted upon rotatable discs for imparting momentum thereto, whereby the kinetic energy of the fluid flow may be transformed into torque to operate rotating elements. The efficiency of such machinery depends in part on the prevention of leakage of working fluid past the tips of the blades. Such leakage results in losses in the amount of momentum transferred from the fluid to the blades, and thus reduces usable energy.

The structure of typical turbomachinery, and particularly of turbojet engines, incorporates a casing which surrounds a turbine comprising the aforementioned blades. It is one function of the casing to define the outer boundary of the hot gas passage in the vicinity of rotating blading. It may be appreciated that gaps between the radially outward blade ends (blade tips) and the casing will permit portions of the working fluid to bypass the rotating blading and result in losses in efficiency.

It has thus been an aim of the prior art design efforts to minimize gaps between turbine blade tips and mating casings while maintaining structural integrity of the components. Generally cylindrical sealing shrouds have been devised which may be supported by the encircling casing in sealing proximity to rotating turbine blade tips. Problems of wear between shrouds and blade tips have arisen due to the difficulty of maintaining tolerances required for the perfect disposition and alignment of shrouds and turbine blades. These problems are particularly prevalent in machinery where critical clearance to diameter ratios are maintained, as for example in turbojet engines.

The situation is aggravated in machinery which is subjected to elevated operating temperatures, for in these circumstances, transient thermal effects upon machine elements, and particularly upon the turbine and shroud assembly, tend to distort various dimensions of the elements and to create additional clearance problems. Additionally, the elevated temperature environment at which the machine may operate will require the utilization of a cooling system therefor in order to prevent damage to the shroud due to the effects of these temperatures.

In order to attempt to produce an efficient shroud seal about turbine blade tips, while avoiding the ill effects of the possible rubbing upon the shroud of the rapidly rotating bladed turbine, it has been suggested that a material be used in the shroud which is substantially more amenable to abrasion than the material of the turbine blades. In this way, the shroud may be designed to very effectively seal with respect to the blade tips, and yet not be subject to or the source of destructive frictional engagement with the blade tips while the machine is in operation. Rather, the rotation of the bladed turbine and the rubbing upon the shroud of the blade tips tends to wear an annular groove in the shroud in which the blades may freely rotate and yet maintain the desired uniform cooling. Abradable shrouds of this variety have been formed of a well-known honeycomb material which has served well to accept abrasion during low temperature operation while maintaining efficient seals with rotating blade tips. Similarly, other materials of high porosity have been successfully used as low temperature abradable shrouds.

In turbojet engine applications, wherein the machine operates at extremely elevated temperatures, means for cooling the turbine encircling shrouds have become necessary in order to maintain structural integrity. Cooling air has been directed from an appropriate plenum to the shroud for the cooling thereof. Most efficient shroud cooling has been found to be provided by the impingement of the cooling fluid flow upon the radially outward shroud surface and the subsequent transpiration of the cooling fluid through the shroud material. Prior art attempts to cool honeycomb have been limited to impingement cooling of the backing strip thereof, owing to the lack of amenability of honeycomb to cooling by transpiration. As a result, honeycomb shroud material has proven difficult to cool efficiently.

In accordance with the cooling requirements of sealing shrouds, shroud materials have been suggested which, unlike honeycomb, allow the passage therethrough of amounts of cooling fluid as determined by the preselected permeability of the shroud material. In order to maintain the overall efficiency of the engine, it has become evident that the permeability of the shroud must be relatively low; that is, the quantity of cooling fluid passing through the shroud must be kept to a minimum.

A conflict, however, has arisen in high-temperature applications which require contemporaneous provision for effective shroud cooling and the capability for the shroud to withstand substantial abrasion. The honeycomb material described above, or similar materials having high porosity, are effective to accept low temperature abrasion. But high-porosity materials are not effective to limit the flow therethrough of cooling air to efficient amounts. On the other hand, materials having low porosity, while effective to limit cooling flow therethrough, are incapable of withstanding substantial abrasion. One possible result of blade tip rub-on shrouds of the latter variety of material is the burning of a large hole, thus permitting the passage therethrough of great quantities of cooling fluid. This results in decreased efficiency and potentially in the starvation of serially connected cooling systems.

The present invention successfully solves the contemporaneous problems of metering cooling flow and withstanding substantial abrasion.

It is therefore an object of the present invention to provide a turbine blade tip-sealing shroud having improved abrasion and controlled cooling characteristics.

It is a further object of the present invention to provide such a shroud having the capability of withstanding substantial turbine blade abrasion while maintaining desired cooling fluid flow control.

It is a more particular object of the present invention to provide a turbine blade tip-sealing shroud having the capability of being cooled by transpiration and of effectively metering cooling fluid therethrough, and which further maintains these capabilities regardless of abrasion by turbine blades.

SUMMARY OF THE INVENTION

Stated briefly, the present invention in one form thereof provides a substantially cylindrical, or conical surface of revolution, turbine blade tip-sealing shroud formed of at least two layers of sintered metal, the layers having controlled and different porosities. A radially outward layer having low porosity provides the capability for metering cooling fluid flowing therethrough. A radially inward layer is disposed proximate the rotating turbine blade tips and has a porosity larger than that of the outer layer, which large porosity allows the inner layer to withstand abrasion by turbine blade tips while maintaining the passage therethrough of the cooling fluid supplied through the outer layer. The two layers may be formed by sintering in a single piece, or may be formed in separate pieces and bonded or brought together in an appropriate manner.

Further objects of the present invention will become apparent from the following description of a preferred embodiment thereof taken in conjunction with the appended drawings wherein.

DESCRIPTION OF A PREFERRED EMBODIMENT

The principles disclosed hereinafter are related in the preferred embodiment to turbojet engines. But it may be appreciated by one skilled in the art that modifications thereof and applications to various types of turbomachinery can be made without departing from the spirit of the present invention.

Figure 1:
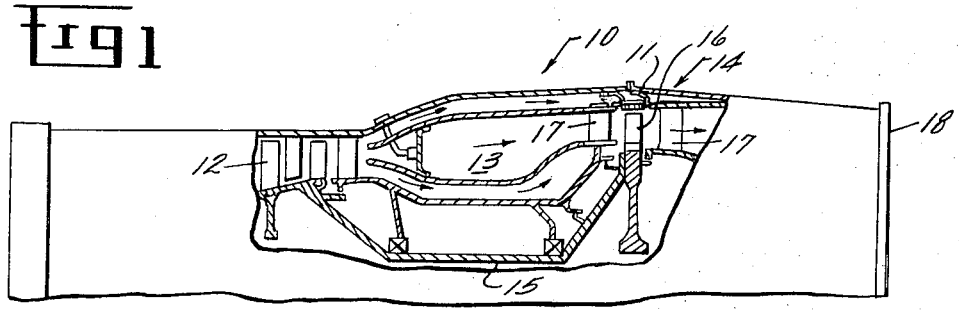
FIG. 1 is a sectional view of a simplified typical turbojet engine showing the common elements thereof and incorporating a shroud according to the present invention.

FIG. 1 depicts the elements of a simplified typical turbojet engine. The engine generally designated 10 has a substantially cylindrical casing 11 which encircles compressor 12, combustor 13, and turbine 14. The rotating elements of compressor 12 and turbine 14 are mutually supported by rotatable shaft 15. The turbine incorporates a plurality of rotor blades 16, a plurality of stator vanes 17, and a substantially cylindrical or conical turbine blade tip-sealing shroud 18 encircling the rotor blades.

The turbojet engine of FIG. 1 operates in the conventional manner wherein atmospheric air traverses the engine from left to right to be first pressurized by compressor 12. Directing elements guide a portion of the compressed air into a combustor 13, wherein the burning of an appropriate fuel adds thermal energy to the air. Subsequently, the working fluid (the mixture of air and burned fuel) leaving the combustor passes through turbine 14 and into engagement with the blades thereof. A portion of the momentum of the working fluid is transferred to the turbine rotor blades to be converted into torque for the driving of compressor 12 by means of shaft 15.

It may be appreciated that the efficiency with which the turbine converts the kinetic energy of the working fluid into torque is in part dependent upon the prevention of leakage of working fluid past the turbine blade tip. Such leakage will result in a portion of the flow of working fluid bypassing the turbine blades and failing to deliver momentum thereto. A particularly troublesome area for such leakage is the space between the turbine blade tips and adjacent casing walls. Thus, various types of shrouds have been introduced into this space for the purpose of providing seals between the casing and blade tips. As has been discussed, such shrouds have suffered from the concurrent problems of high operating temperatures and abrasion by blade tip rubs. Both problems are dealt with by means of the present invention.

Figure 2:
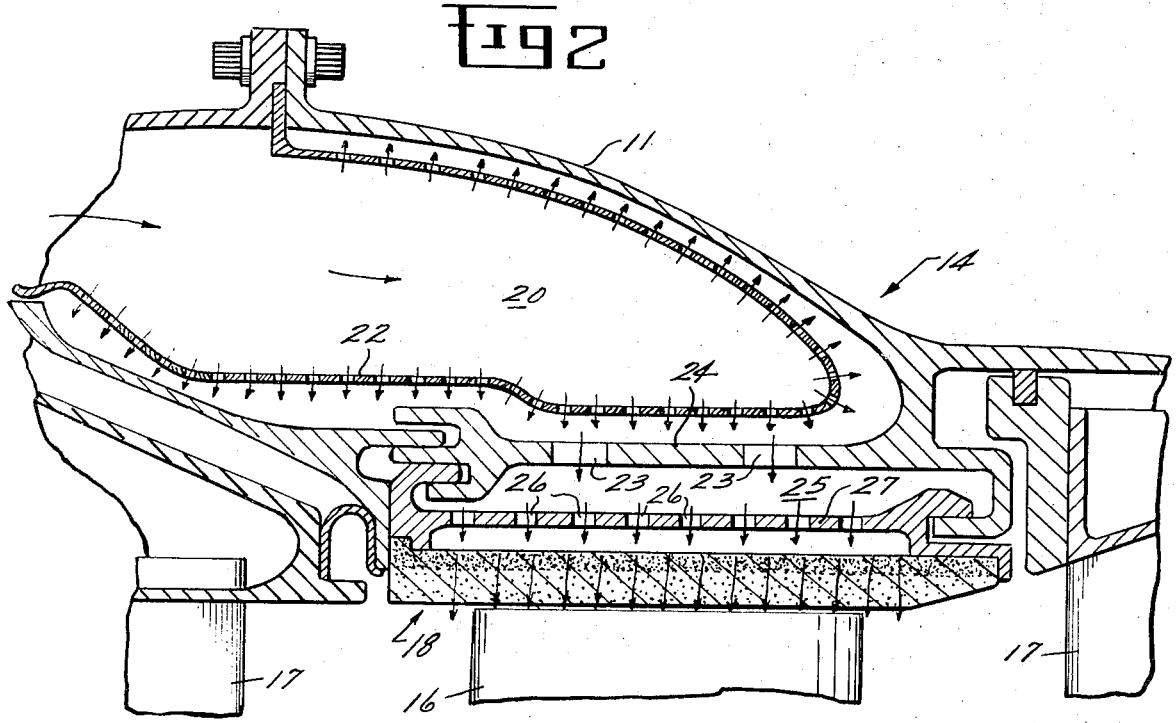
FIG. 2 is an enlarged view of a portion of the turbojet engine of FIG. 1 in the area of a typical turbine blade thereof and incorporating the blade tip-sealing shroud of the present invention.

FIG. 2 discloses with greater particularity a portion of the turbojet engine of FIG. 1, including a typical turbine rotor blade 16. The depiction includes various support members and cooling structure and shows cooling air flow paths indicated by arrows.

The turbine blade-tip sealing shroud 18 of the present invention is disposed in an annular space between the tip of rotor blade 16 and casing 11. As was described generally hereinbefore, turbine efficiency demands that a substantially fluid-tight seal be formed between the tip of blade 16 and shroud 18. Thus, the clearance between blade tip and shroud must be held to a minimum during operation of the engine. As a result, the shroud 18 must be capable of remaining intact and operative despite rubbing and consequent abrasion by blade tips. At high temperature turbine environment operation, the transient thermal effects may distort relative positions and cause the blades to engage the shroud.

Concurrently, the shroud must be protected against the extreme heat of the working fluid passing thereby. So an effective shroud cooling system is also provided. The cooling system for shroud 18 includes a plenum 20 of appropriate size and shape surrounding shroud 18. The plenum 20 is provided with cooling air from the compressor, or supplied from other external sources outside the engine system. The plenum serves to provide uniform pressure to supply the proper quantity of cooling air to the shroud 18 during engine operation.

Air within plenum 20 impinges as the liner 22, which serves to maintain controlled thermal growth of the inner surfaces of casing 11 and casing support member 24. This even distribution of cooling air is provided in order to prevent, as much as possible, thermal gradients between adjacent portions of the casing and support structure. Apertures 23 in support member 24 allow the passage of cooling air into annular space 25. From this space, the cooling air flows through a plurality of orifices 26 in a shroud outer band 27. The band 27 and its orifices 26 promotes impinging flow of the cooling air onto the radially outward surface of shroud 18 for the even cooling thereof. Further cooling of the shroud is accomplished by transpiration, as is discussed hereinafter.

Figure 3:
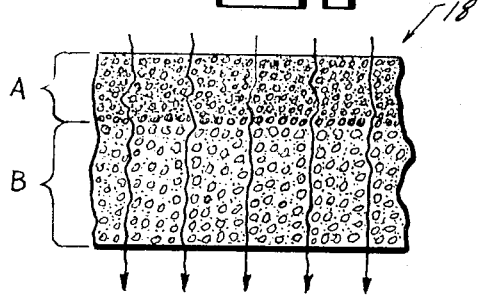
FIG. 3 is an enlarged view of a portion of the shroud of FIG. 2 disclosing the porous structure thereof.

FIG. 3 shows an enlarged view of a portion of shroud 18. The flow of cooling air in transpiration through the shroud is represented by the arrows shown. FIG. 3 also illustrates the manner in which the present invention departs from the prior art in providing for combined shroud cooling and non-destructive abrasion by the engagement of the rotor blades.

The shroud 18 is formed of at least two layers of porous material, designated A and B. Layer A forms the radially outer surface of shroud 18 and is of a predetermined substantially uniform and relatively low first porosity. The low porosity of this layer serves to meter the flow of cooling air passing through its thickness. As discussed above, it is necessary to meter the flow of cooling air through the shroud in order to maintain the efficiency of the turbojet engine without wasting cooling air. Furthermore, in order to insure even distribution of the cooling air throughout the shroud, layer A is preferably of uniform porosity.

The radially inner surface of shroud 18 is defined by layer B. Layer B has a predetermined and substantially uniform second porosity, greater than the porosity of layer A, and great enough to survive the rubbing thereupon by the tip of rotating rotor blade 16. Yet, the porosity of layer B is not so great as to present an aerodynamically inefficient surface to the passing working fluid. (The honeycomb material of the prior art has been objectionable on this basis.) Furthermore, in accordance with a major objective of the present invention, the relationship of the porosity of layers A and B is such that the abrasion of layer B by the blades will not have substantial effect upon the overall transpiration of cooling air through the shroud. The rate of flow of cooling air through the shroud will still be determined by layer A despite the possible partial surface smearing of some of the pores of layer B during abrasion. Consequently, the present invention solves the concurrent cooling and abrasion problems of the prior art without sacrificing engine efficiency.

Under operating conditions, the rubbing of blade 16 abrades the inner surface of shroud 18 and forms an annular groove in layer B which the blade tip occupies during engine operation. In this way, a reliable fluid seal is maintained between the shroud and the blade tip despite variation in relative positions thereof under operating conditions. Further, as described, the possible partial surface smearing or some of the pores of layer B proximate the abrasion has no substantial effect upon transpiration through the shroud.

The construction of the shroud according to the first embodiment of the present invention, depicted in FIG. 3, is preferably performed by sintering. The porosities of layers A and B of shroud 18 can be controlled during the sintering process, and the shroud may be formed as a single unit. Alternatively, layers A and B might be formed separately and later bonded or joined in some appropriate fashion. At any rate, the sintered metal forming layers A and B is preferably substantially uniform in porosity within each layer in order to evenly distribute the flow of cooling air through the shroud, and to effectively distribute the effects of the abrasion of the shroud by the rotating blade tips. This is a further improvement over the honeycomb shroud materials of the prior art which are characterized by non-uniform porosities in the form of adjacent solid and vacant spaces.

Figure 4:
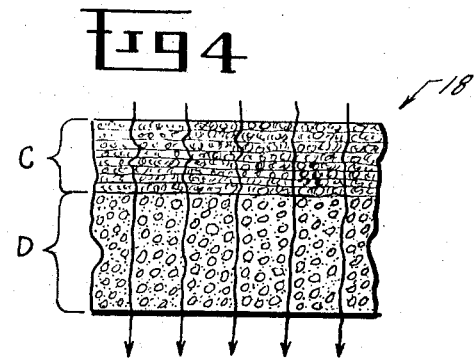
FIG. 4 is an enlarged view of a portion of shroud according to a second embodiment of the present invention.

FIG. 4 discloses a second embodiment of the shroud structure, wherein the radially outward shroud layer C is formed of laminated wire cloth matrix, while the radially inward layer D remains sintered metal. Layers C and D may be formed with the same relative porosities as layers A and B of FIG. 3, in order to accomplish the same results. That is, layer C may be formed with a porosity appropriate to the metering of cooling airflow; and layer D with larger and substantially uniform porosity for withstanding damage under abrasion as well as for maintaining desired cooling airflow. Other modifications in the construction of the layered shroud of the present invention are possible without departing from the spirit thereof.

Generally, it will be recognized by one skilled in the art that the present invention is a substantial improvement over the turbine blade tip-sealing shrouds of the prior art. The shroud of the present invention has the capability of controlling the flow of cooling fluid therethrough, and further of surviving abrasion under the influence of turbine blade tips. While maintaining constant cooling airflow, these combined capabilities serve to enhance the operating reliability of shrouds employing the present invention, and to maintain the structural integrity of shrouds and associated cooled elements during high-temperature engine operation.

In operation, the shroud cooling system functions as follows. Cooling air is introduced into plenum 20 of FIG. 2 and is directed by impingement liner 22 uniformly against the inner surfaces of casing 11 and of support member 24. Air directed against support member 24 passes through apertures 23 therein and into annular space 25, from which it is directed by orifices 26 in shroud outer band 27 in an impinging flow against the radially outer surface of shroud 18. The amount of cooling air which transpires through shroud 18 is determined by the porosity of layer A of the shroud in FIG. 3, and by layer C of the shroud in FIG. 4.

Contemporaneously, turbine blade 16 rotates at a high angular velocity under the influence of the working fluid from combustors 13 in FIG. 1. During engine operation, as temperatures vary over wide ranges, the relative positions of the tip of turbine blade 16 and the radially inner surface of shroud 18 vary. During a portion of this variation, the tip of blade 16 will come into frictional engagement with the inner surface of shroud 18, and the shroud will be abraded thereby. Such abrasion creates a substantially annular depression in shroud 18 within which blade tip 16 may freely rotate. The proximity which the abradable character of the shroud allows between blade tip and shroud permits a substantially fluid-tight seal to be created therebetween. Thus, leakage of working fluid between blade tip and shroud is substantially minimized.

Owing to the large porosity of layer B of FIG. 3 and layer D of FIG. 4, abrasion by turbine blade 16, while having the possible effect of clogging and constricting the pores of the material where the abrasion occurs, will not have the effect of reducing cooling airflow through the shroud since the porosity of the inner layer remains higher than that of the outer layer even where clogging has occurred. Thus, the transpiration rate through the outer layer will be maintained despite abrasion of the inner layer. In sum, the present invention combines the abradability of honeycomb shroud material with the cooling flow control of single layer porous shrouds and a smoother flow path in order to provide the beneficial characteristics of each, combined with the embodiment of one component, without being subject to the operational limitations thereof.

Numerous variations of the embodiments disclosed herein may be made without departing from the spirit of the present invention. For example, while the embodiment herein disclosed is formed of sintered material having controlled first and second layer porosities, similar operational results might be achieved by the use of a shroud comprising separate first and second layers of different porosities bonded together by some appropriate means.

Accordingly, while a preferred embodiment has been depicted and described, it will be appreciated that many modifications and changes may be made thereto without departing from the fundamental theme of the invention.

What is claimed as new and desired to be secured by letters Patent of the United States is:

1. A turbomachine comprising:
    a rotatable bladed turbine rotor;
    a casing surrounding said turbine rotor;
    a blade-tip sealing shroud carried by said casing and encircling said turbine rotor, said shroud including radially outer and inner layers of porous material, the porosity of the inner layer being greater than the porosity of the outer layer, and the inner layer abradable by frictional engagement with said turbine rotor;
    said radially outer and inner layers of porous material being formed in a single unit of sintered metal having controlled first and second porosities respectively;
    a plenum of air for cooling said shroud carried by said casing and surrounding said blade-tip sealing shroud; and
    means for delivering to said outer layer cooling air from said plenum for cooling said shroud by transpiration; and wherein
    the porosity of said outer layer meters a predetermined flow through said shroud of cooling air from said plenum, and the porosity of said inner layer maintains said predetermined flow despite abrasion by said turbine rotor.

2. The turbomachine of claim 1 further comprising:

an apertured plate disposed between said plenum and said shroud for directing said cooling air onto said outer layer in a plurality of spaced impinging jets, whereby said shroud is substantially evenly cooled.

3. The turbomachine of claim 1 wherein:
    said radially outer layer is formed of laminated wire cloth matrix.

* * * * *